United States Patent Office

3,490,050
Patented Jan. 13, 1970

3,490,050
DAMAGE-RESISTANT OPTICAL PARAMETRIC DEVICE
Daniel Weiner, Keyport, N.J., assignor to Bell Telephone Laboratories, Incorporated, Murray Hill, N.J., a corporation of New York
Filed Jan. 4, 1968, Ser. No. 695,660
Int. Cl. H03f 7/06
U.S. Cl. 330—4.5          5 Claims

ABSTRACT OF THE DISCLOSURE

In the optical devices disclosed, the active crystalline ferroelectric material is finely divided and colloidally suspended in a transparent suspending agent to overcome the typical radiation damage effects of intense optical beams. A suitable average alignment of the particles is maintained by an applied energy field.

BACKGROUND OF THE INVENTION

The invention is concerned with devices useful for the generation, amplification or modulation of electromagnetic wave energy at optical frequencies. Optical frequencies include those of the visible spectrum, the infrared and the ultraviolet.

In order to transmit information optically, it is desirable to employ an intense optical beam and to perform necessary operations such as amplification, modulation and frequency shifting by passing the beam through suitable transparent material, which typically produces the desired effect in a distributed fashion throughout its bulk. Two such materials, generally utilized in their ferroelectric states, are lithium tantalate ($LiTaO_3$) and lithium meta-niobate ($LiNbO_3$).

It has been known for some time that the passage of intense visible light through these materials may result in refractive index inhomogeneities and resultant beam spreading. While it has been possible to select specimen portions which are not susceptible to such damage, so that modulators and generators have been operated for long periods at high power levels, the fact remains that most effective quantity production of such items has not been possible. Moreover, refractive index inhomogeneities and beam spreading have been observed in some piezoelectric semiconductors under some conditions.

It is desirable that means be provided for avoiding these index inhomogeneities, or at least their deleterious effects, in optical devices.

SUMMARY OF THE INVENTION

According to my invention, ferroelectric materials and semiconductive materials useful in optical devices are made damage-resistant in the presence of intense optical radiation by colloidally suspending a finely divided mass of the crystalline material in an optically transparent suspending agent. An electric field, or other effective energy field, is applied to the suspension in a selected direction to provide an average alignment of the particles along that direction. The alignment enables the material to provide an optical amplification, modulation or parametric effect substantially similar to that of the crystalline material. Insofar as any of the material particles may suffer damage, these particles will not have a deleterious effect on the result if they are much smaller than a wavelength of the optical energy. In addition, other scattering losses will be reduced; and the tendency to damage may be reduced. Because of lower scattering loss, the interaction path length can be substantially increased, more than offsetting the diluting effect of the suspending agent upon the desired optical modulating or parametric effect.

According to another aspect of my invention, an optical device employing a colloidal suspension may also be useful at infrared wavelengths for which damage does not occur, because tuning can be accomplished by changing the concentration of colloidal particles.

DETAILED DESCRIPTION OF ILLUSTRATIVE EMBODIMENT

Figure 1:
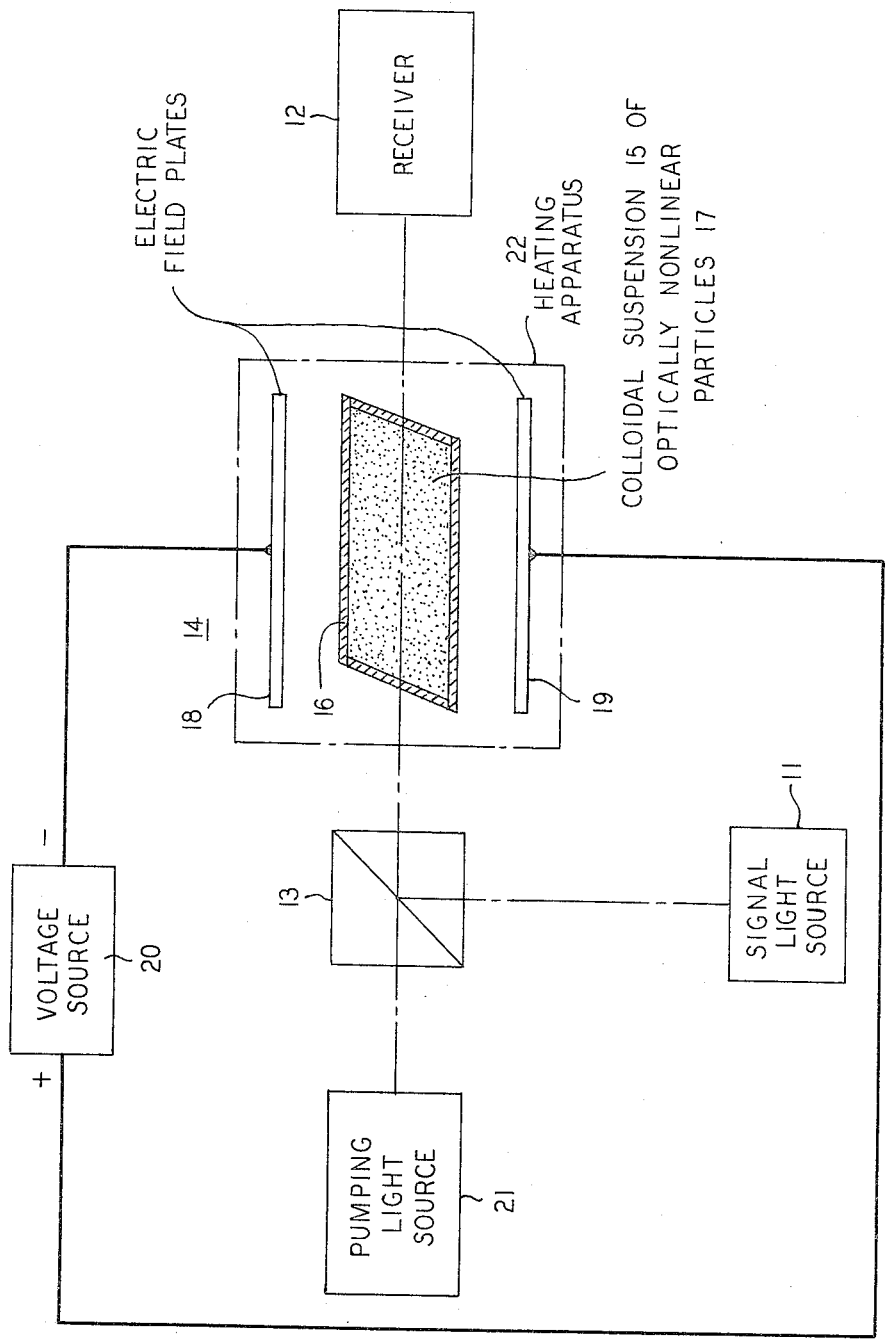
FIG. 1 is a partially pictorial and partially block diagrammatic plan view of a lithium meta-niobate parametric amplifier devised in accordance with my invention.

In FIG. 1, it is desired to amplify the information signal carried on an optical beam and supplied from the signal light source 11. The amplified signal is detected in the receiver 12, which may comprise a conventional photodetector. The signal beam is partially reflected from the polarization selective reflector 13, the surface of which is parallel to the polarization of the light from source 11. From reflector 13, the signal beam propagates into the parametric amplifier 14 which includes, as an active medium, the colloidal suspension 15 in a suitable glass- or Pyrex-walled container 16. The colloidal suspension 15 includes colloidal-sized particles 17 of an optically nonlinear material, illustratively lithium meta-niobate, in a suitable transparent suspending agent. The end faces of the container 16, through which the light passes, are oriented approximately at the Brewster angle for the signal beam. The amplifier 14 further includes the plane parallel electrodes 18 and 19 oriented to provide an electric field through the suspension 15 orthogonal to the light propagation direction. The electrodes 18 and 19 are connected to opposite terminals of a voltage source 20.

Also applied to the amplifier 14 is an intense pumping light beam from a light source 21. This beam is polarized in the plane of the paper, in other words, orthogonal to the polarization of the beam from source 11, and is readily passed through polarization selective reflector 13 into the colloidal suspension 15 of amplifier 14 substantially collinearly with the signal light beam. Also a part of the amplifier 14 is the heating apparatus 22 which encloses the remaining components and maintains the colloidal suspension 15 at a convenient temperature, e.g., 25 degrees centigrade, since operation in this manner provides a temperature level at which the device may be conveniently stabilized.

Figure 2:
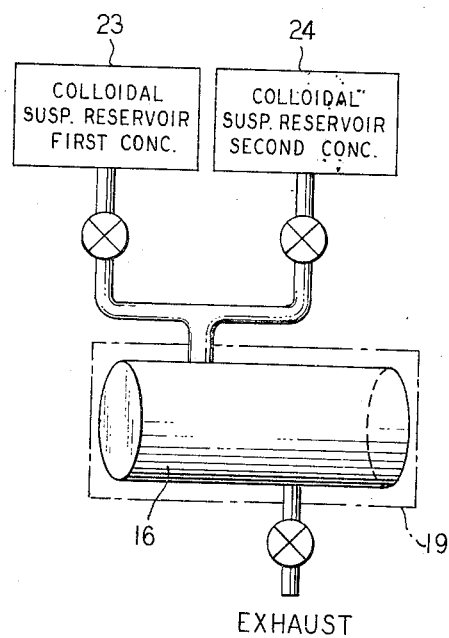
FIG. 2 is a partial side elevation of a modification of the apparatus of FIG. 1 showing means for varying the suspension concentration.

As shown in FIG. 2, the suspension may be introduced into container 16 either from a reservoir 23 or a reservoir 24, having different concentrations of active particles in colloidal suspension.

It is to be understood that the composition of the crystalline lithium meta-niobate material, from which the particles 17 are made, may includes impurities or intentionally added ingredients up to about 5 percent by weight of the composition. Some such materials may be added, for example, to alter the birefringence. Nevertheless, it is not essential in my invention to add any such ingredients to secure single domain material. Each colloidal particle is so small that it will automatically tend to form itself into a single domain. The colloidal particles of the very small size (less than 100 A.) proposed may be formed by carefully regulated condensation of lithium niobate vapor upon suitable lithium niobate nuclei. The general technique is known as preparation of monodisperse aerosols by slow condensation upon nuclei. It is described in the book by H. L. Green et al., Particulate Clouds: Dusts, Smokes and Mists, published by Van Nostrand, 1957, pp. 18 through 22. A reservoir of lithium niobate is vaporized by heating it electrically to a temperature well in excess of 1200 degrees centigrade in a suitable ceramic container. (1162 degrees centigrade is the melting point.) Dry nitrogen, freed from foreign nuclei, is passed over or bubbled through the vaporizing liquid and is mixed with a stream of clean nitrogen containing a regulated number of condensation nuclei which are produced in a separate ceramic chamber by a spark or arc discharge through a thin lithium niobate crystal. The mixture of gas, lithium niobate vapor, and nuclei passes through two small jets into a re-heater ceramic flask heated electrically to about 1300 degrees centigrade (in excess of the boiling point), where any residual spray is vaporized and the nuclei are well mixed with the vapor. It then passes up a long double walled chimney in which it is slowly and uniformly cooled, becoming super-saturated and condensing uniformly upon the nuclei to form fine aerosol particles. The boiler and re-heater flasks are enclosed in an insulated electrically heated box equipped with thermostatic regulators in order to minimize temperature fluctuations which tend to deform the particle size of the aerosol. Particle size is controlled by varying the temperature of the lithium niobate reservoir. Although the nuclei themselves may not be uniform in size as produced by the arc, the resulting aerosol is nonetheless remarkably uniform in particle size. Particles with radii less than 0.01 micron (100 A.) are readily obtained.

The colloidal particles 17 are grown to have sizes of less than 100 angstrom units. Their average concentration is approximately 10 percent by volume, as is also the concentration in reservoir 23.

The transparent suspending agent of the suspension 15 is chosen to be a liquid Freon such as the polyfluorinated heptane ($C_7F_{16}$), which has low dispersion and low infrared absorption.

The DC voltage supplied from source 20 is illustratively 1000 volts for a separation of electrodes 18 and 19 of 0.1 centimeter. The resulting voltage gradient is sufficient to align substantially all of the uniaxial crystals with their C-axes along the electric field. The cell length is a few centimeters.

The pumping light source 21 includes a helium-neon laser operating at 6328 A. and suitable means, such as a potassium dihydrogen phosphate (KDP) electro-optic modulator, for modulating the radiation. The signal light source 11 is illustratively a coherent light oscillator operating at a wavelength near 1.06 microns. Each of the sources 11 and 21 includes as some part of the apparatus suitable means for polarizing the light.

The polarization selective reflector 13 is illustratively a Nicol prism formed of two triangular prisms of optical quality calcite such that the desired reflection of the 1.06 micron beam is achieved simultaneously with the desired transmission of the 6328 A. beam.

The photodetector of receiver 12 illustratively is a germanium photodetector of type now well known in the optical art.

In operation, a three-quantum interaction occurs in the particles 17 of the suspension 15 as a result of a large second-order nonlinear interaction in the lithium metaniobate. The parametric interaction is effective to generate an idler wave at a frequency of about 1.58 microns.

As the signal and pumping beams pass through a given particle, generating an idler wave, a slight phase deviation from the desired phase-matched condition occurs and produces a corresponding slightly lower power transfer from the pumping wave to the signal and idler waves than would occur in perfectly phase-matched crystalline material. The net phase deviation is reduced and substantially eliminated by the subsequent passage of the three waves through the transparent liquid between neighboring particles. On the average, the over-all effect is one of phase-matched operation in the sense that the cell can be made as long as desired. Indeed, increased length of the cell will compensate for reduced strength of the optical nonlinear (parametric) interaction. The very low optical dispersion of $C_7F_{16}$ allows us to achieve this condition for the convenient case of propagation normal to the average direction of the optic axes of the particles (and to the electric field) at reasonable (approximately 10 percent) concentration of $LiNbO_3$.

Although it is known that the intense optical pumping light beam from source 21 will damage the nonlinear material in a large crystal, it is not known exactly what the mechanism of the damage is. For example, it is possible to select crystals which are not so damaged. Thus, if the damage is a result of a strain-type effect in large crystals, such strains should be characteristically absent from the colloidal particles suspended according to the present invention.

Moreover, even if some of the small particles are damaged, there is negligible scattering loss from these particles because they are substantially smaller than a wavelength. In other words, the net scattering of the light is predominantly coherent and in the forward direction.

Moreover, in the bulk crystalline material there are other scattering losses in addition to those resulting from the induced optical index inhomogeneities. These other scattering losses are substantially reduced in a device according to my invention because, again, the particles are too small to produce those other scattering losses. As a result, the interaction path length can be substantially greater than in the bulk crystalline material.

In order to tune the parametric interaction, it is necessary to vary the frequency of only one of the sources 11 or 21 and to adjust the voltage on the electrodes 18 and 19, or adjust the temperature, or adjust the concentration of colloidal particles, for example, by introducing a suspension from the source 24 of FIG. 2. Thus, a high degree of stability of the alignment of the container 16 in the optical propagation path may be maintained. More specifically, the concentration of colloidal particles may be adjusted, as shown in FIG. 2, by providing inlet and outlet valves for container 16 and coupling the inlet valves to a plurality of reservoirs 23 and 24 of colloidal suspensions, each having a different concentration of the $LiNbO_3$ particles. Any desired concentration between those of reservoirs 23 and 24 may be achieved by adjusting the inlet valves to obtain a mixture.

It should be apparent that the principles of my invention are also applicable to electro-optic modulators, in which the modulating electric field can be applied in any desired orientation relative to the orientation of the aligning electric field. The principles of my invention are also applicable to parametric oscillators, illustratively employed in frequency shifters and mixers in communication systems, in which an optical resonator for signal and idler beams is provided and the only input light source needed is the pumping light source. The optical resonator would be disposed in the desired propagation direction of the signal beam, which would illustratively be the long dimension of the colloidal suspension 15 in container 16.

Other materials in addition to those disclosed can be employed according to my invention. These materials include other ferroelectrics such as lithium tantalate and some titanates and piezoelectric semiconductors, such as cadmium sulfide, which can exhibit optical index inhomogeneities when subjected to light beams near the band gap of the material.

Various modifications of the disclosed embodiment may be made. For example, the transparent suspending agent can be a gas in which the colloidal particles are suspended by the Brownian motion. To prevent particles from setting out, the container would be rotated or oscillated very slowly. This modification provides the advantages of negligible frequency dispersion and absorption in the suspending medium. The negligible dispersion enables the apparatus to be adjusted for exact phase-matching of the waves within the active colloidal particles.

In addition, the suspending agent could be a solid. For example, a gelatinous suspending agent could be gelled after the colloidal particles are aligned. Or, the colloidal particles could be aligned in other solid suspending agents, formed with the particles dispersed throughout, by subsequent application of a very high electric field to the solid. In either case, the field might then be removed or else varied for fine tuning. A technique for forming small particles dispersed throughout a solid is described in the article by G. P. Wertz and M. E. Fine, "Super-paramagnetic Magnesioferrite Precipitates From Dilute Solusions of Iron in MgO", Journal of Applied Physics, vol. 38, p. 3729, August, 1967. Preferably one would employ those particles in the smaller size ranges, as obtained by aging at relatively high temperatures (800 degrees centigrade). Similar techniques can be used for making colloidal suspensions of materials subject to optically-induced damage.

In liquid suspensions, charge neutralization can be reduced by circulation of the suspension through an external heater.

What is claimed is:

1. An optical device comprising an active medium including a material that in bulk exhibits a refractive index inhomogeneity caused by applied optical radiation, said medium comprising colloidal particles of said material of dimensions substantially smaller than the wavelengths of said waves and a suspending agent suspending said particles, said suspending agent being substantially transparent so said waves; means for applying said optical radiation to said medium for transmission therethrough and active interaction therewith; and means for applying an energy field to said medium to align said particles at a selected average angle.

2. An optical device according to claim 1 in which the active medium comprises colloidal particles of a ferroelectric medium.

3. An optical device according to claim 1 in which the active medium comprises colloidal particles of a material pumping, signal and idler waves, the combination of the suspending agent and said particles being birefringent to a degree permitting phase-matching as the averaged propagation effect of said suspending agent and said particles and in which which the energy field applying means is applied in a direction to align said particles at a selected average angle with respect to the directions of propagation of said waves, said selected angle enabling phase-matching among said waves.

4. An optical device according to claim 1 in which the active medium comprises colloidal particles of a ferroelectric material and the energy field applying means applies an electric field to said medium to align said particles at a selected average angle.

5. An optical device according to claim 1 including means for varying the concentration of colloidal particles in the active medium.

No references cited.

ROY LAKE, Primary Examiner

DARWIN R. HOSTETTER, Assistant Examiner

U.S. Cl. X.R.

321—69; 330—53, 4.6; 331—107; 350—160